July 12, 1966  J. A. MARLAND  3,260,460
RADIANT AND HOT AIR HEATING SYSTEM
Filed June 1, 1965  3 Sheets-Sheet 2

INVENTOR.
Joseph A. Marland
BY
Frost, Burmeister & Kulie
Attorneys

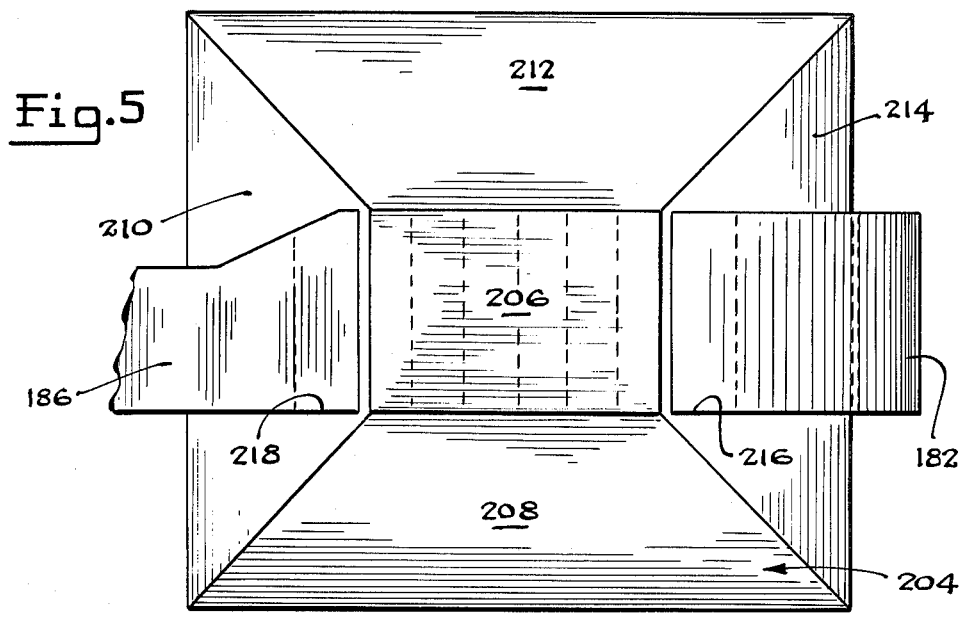
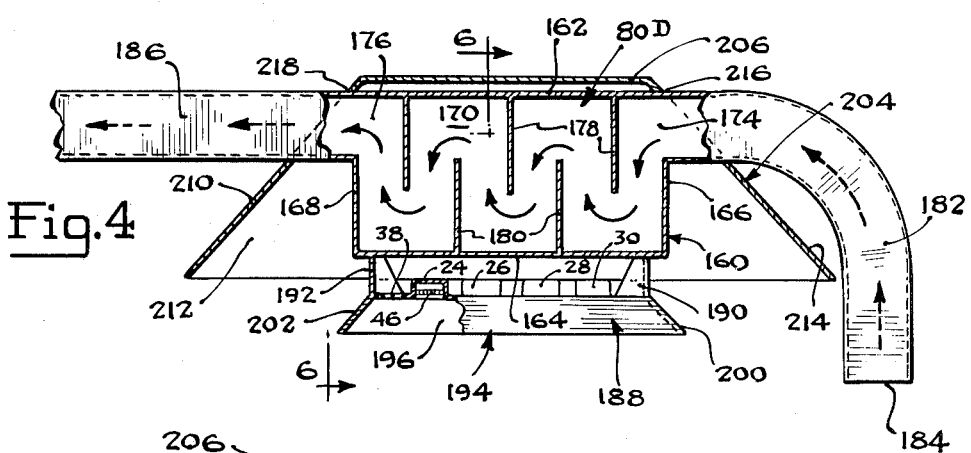
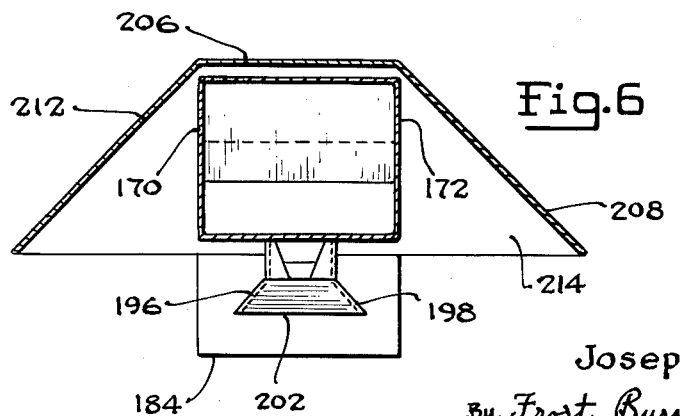
Inventor
Joseph A. Marland
By Frost, Burmeister & Kulie
Attorneys United States Patent Office 3,260,460
Patented July 12, 1966

3,260,460
RADIANT AND HOT AIR HEATING SYSTEM
Joseph A. Marland, La Grange, Ill., assignor to Marland Foundation, La Grange, Ill., a corporation of Illinois
Filed June 1, 1965, Ser. No. 460,201
7 Claims. (Cl. 237—50)

This application is a continuation-in-part of application Serial No. 307,829, filed September 10, 1963, now Patent No. 3,190,556.

The present invention relates to devices for heating enclosed areas. In particular, it relates to devices for heating objects disposed within an area to a higher temperature than can be achieved by mere space heating.

It is often desirable, particularly in factories, garages, mines, and other commercial establishments, to heat an object such as a work piece to a higher temperature than can be achieved by heating the ambient atmosphere to the temperature which is desired for the ambient atmosphere. Many factories, and other establishments, desire their workers to work in relatively cool surroundings, of the order of 60° Fahrenheit in order to promote efficiency, but desire the objects with which these workers are engaged to be at a warmer temperature in order to promote efficiency and skill. The most successful system of heating to achieve these ends utilizes radiant or infra-red heating units. With infra-red heating units, radiation from the units passes through the space between the units and the bodies which will absorb the infra-red radiation. In this manner, the space surrounding the work piece and other bodies is heated by contact with the bodies principally, rather than the reverse process of heating the ambient atmosphere first as in the case of conventional space heaters.

There are a number of types of infra-red generators or radiant heating systems. Infra-red radiation may be generated by infra-red electric bulbs, or by mere hot substances. One of the most suitable sources of infra-red radiation is a low temperature gas burner, such as disclosed in Patent No. 1,567,691 to Wiederhold, Patent No. 2,775,294 to Schwank, or Patent No. 3,044,538 to Honger. A suitable infra-red generator of this type has a housing with an opening which is closed by a porous ceramic plate. The housing forms a cavity adjacent to the plate, and a mixture of illuminating gas and air is introduced into this cavity at a desirable pressure to cause the gas to pass through the perforations of the ceramic plate and burn on the exterior surface of the plate. The ceramic plate permits the gas to burn at a temperature of approximately 1600° in a particular construction of an infra-red generator of this type while maintaining the temperature at the inside surface of the ceramic plate at a temperature of approximately 400° Fahrenheit. Since the temperature confronting the chamber is less than the ignition temperature of the illuminating gas, the illuminating gas will only burn adjacent to the exterior surface of the perforated plate, since it is ignited at the surface. The relatively cool temperature of the infra-red source, namely 1600° Fahrenheit, results in the generation of a relatively large percentage of infra-red energy, approximately 60 percent of the total energy produced by the generator, the remaining 40 percent being in the form of convected heat.

An infra-red energy source of this type produces a relatively large quantity of infra-red radiation for the fuel expended. It may be used to heat a work piece by radiation without heating the space surrounding the work piece to as high a temperature as would be required were the work piece to be heated by means of heating the space first, thus conserving the quantity of fuel expended. In addition, an infra-red generator of this type may be utilized without piping off exhaust gases of combustion. The gases from the infra-red generator merely rise to the upper portions of the structure in which the generator is utilized, and may be vented to the atmosphere by an open port, or the like.

Such units however have certain disadvantages. They fail to utilize the energy generated in the form of heat, and in the particular units described above, the heat energy constitutes approximately 40 percent of the total energy generated. In addition, it may be desirable to heat the space surrounding the work piece to a greater extent than can be achieved by a radiant heating method. Further, there is essentially no heat in portions of a structure which are out of the radiant field of the infra-red generator, since so little of the heat of the generator is converted into space heating. In addition, the exhaust gases and vapors from the burning illuminating gas rise to the upper portions of the structure in which the infra-red generator is utilized and condense on the cold surfaces of the structure. This condensate must be either avoided or removed, or it will drip down upon the work piece and contents of the structure.

It is an object of the present invention to provide a combination space and radiant heater utilizing an illuminating gas infra-red generator.

It is also an object of the present invention to provide an infra-red heating source utilizing illuminating gas which utilizes a larger percentage of the energy generated by the source than infra-red sources of this type have utilized heretofore.

Further, it is an object of the present invention to provide a radiant source of energy utilizing illuminating gas for heating an enclosed area with an improved means for avoiding the deleterious effects of condensate.

These and further objects of the present invention will be readily apparent from a further consideration of this disclosure, particularly when viewed in the light of the drawings, in which:

FIGURE 4 is a fragmentary sectional view of a modified and improved space heater for use in the construction of FIGURE 1;

FIGURE 5 is a plan view of the space heater of FIGURE 4; and

FIGURE 6 is a sectional view taken along the line 6—6 of FIGURE 4.

Figure 1:
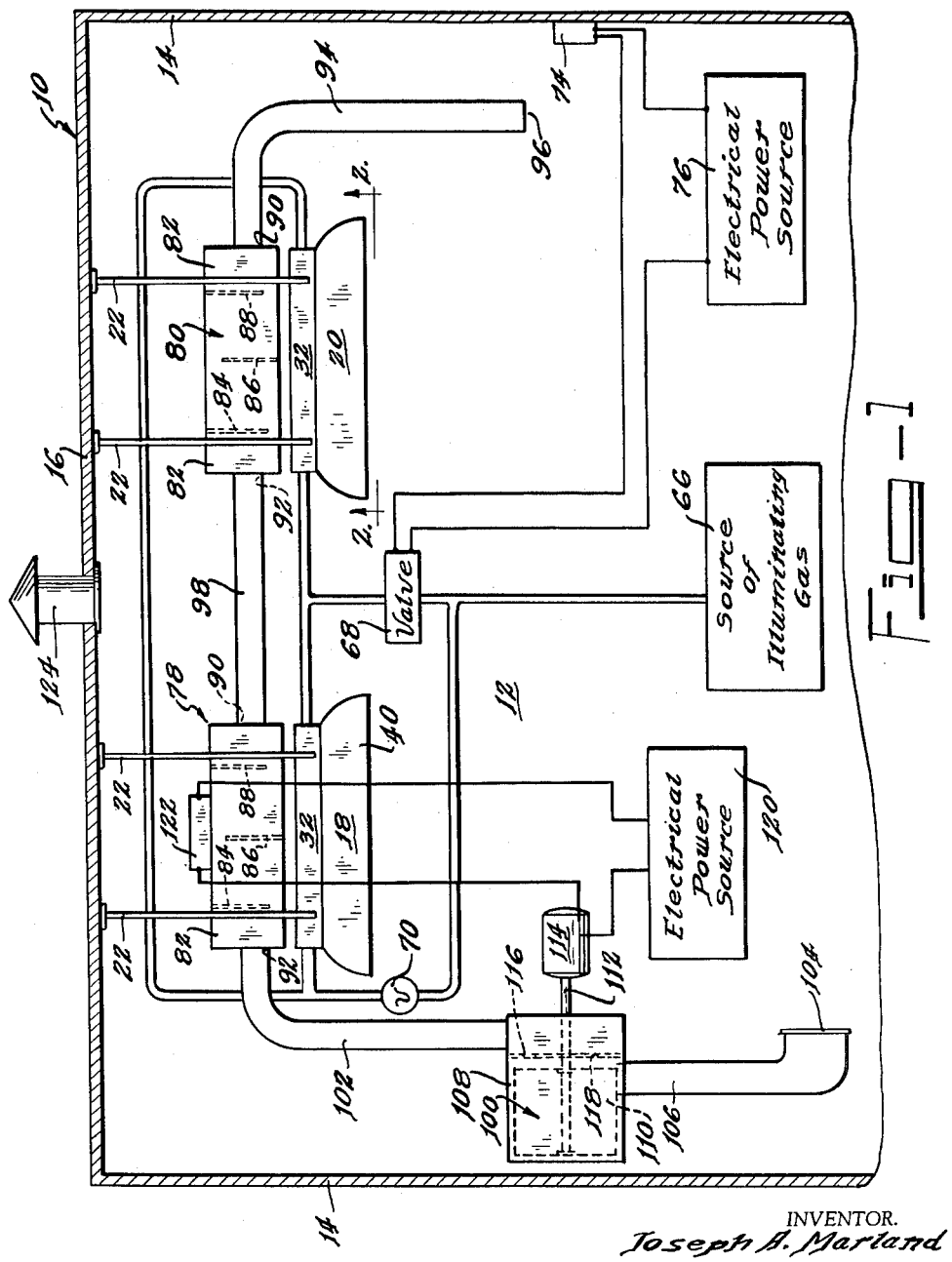
FIGURE 1 is a diagrammatic view of an enclosed area provided with a combination radiant and space heater constructed according to the teachings of the present invention.

In FIGURE 1, a building structure 10 is diagrammatically illustrated for the purpose of providing a confined area 12. The building structure 10 has walls 14 and a roof 16. Within the confined space 12 are two radiant heaters 18 and 20 which are each mounted on the roof 16 by brackets 22.

Figure 2:
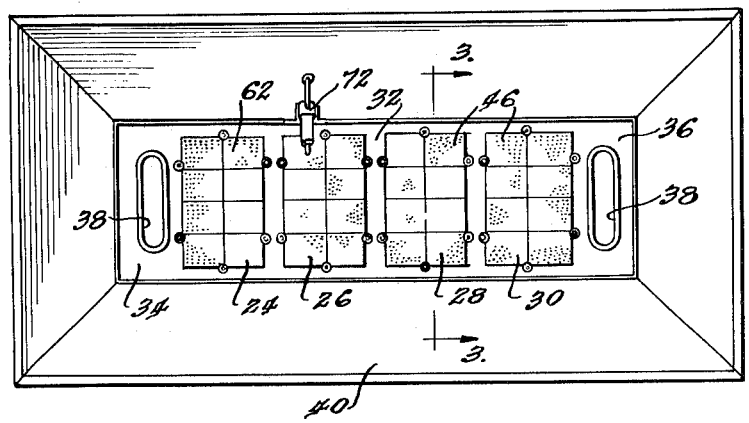
FIGURE 2 is a view of one of the space heaters taken along the line 2—2 in FIGURE 1.

FIGURE 2 illustrates the construction of the radiant heaters 18 and 20 which are identical. Each of the radiant heaters has four infra-red generators 24, 26, 28 and 30, which are also identical in construction. The generators 24, 26, 28 and 30 are generally rectangular in shape and are mounted in a line with their longitudinal axes parallel to each other by a frame 32 which extends about the opposite edges of the generators. The frame 32 also mounts two covers 34 and 36 on opposite ends of the line of generators, and each of the covers is provided with a central orifice 38. A reflector 40 is also mounted on the frame 32 and depends therefrom, the reflector 40 may either have four flat sides generally in the form of a truncated pyramid, or may have parabolic surfaces for directing the radiant energy in the most desirable manner.

Figure 3:
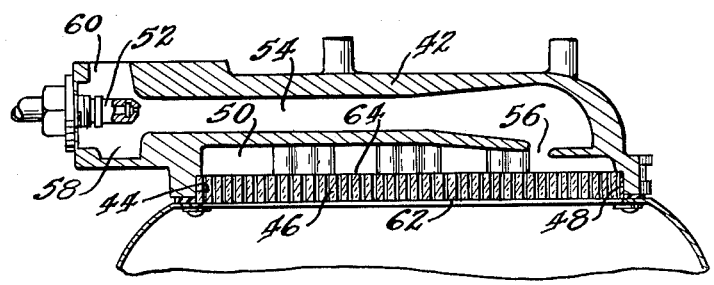
FIGURE 3 is a sectional view of one of the infra-red generators taken along the line 3—3 of FIGURE 2.

Each of the generators 24, 26, 28, and 30 is identical and is illustrated in FIGURE 3. Each generator has a cast iron housing 42 with a rectangular cross section and a generally rectangular opening 44 in its lower surface. A perforated ceramic plate 46 is mounted within the opening 44 of each housing 42, and a sealing strip 48 disposed about the perimeter of the plate 46 seals the perimeter of the plate 46 to the opening of the housing 42. The housing 42 also has a recess forming a cavity 50 confronting the plate 46 which is adapted to contain a mixture of illuminating gas and air.

Illuminating gas is injected into the housing in metered quantities through an orifice plug 52 which is connected to a source of illuminating gas, as will be described hereinafter, and which communicates with a mixer tube or venturi 54. The venturi 54 communicates with the cavity 50 through an opening 56. Also, air from the ambient atmosphere is aspirated through a chamber 58 disposed immediately adjacent to the orifice plug and communicating with the ambient atmosphere through an opening 60.

The orifice plug 52 permits the flow of illuminating gas at a proper pressure into the venturi 54 where it is mixed with air aspirated through the chamber 58 to achieve a proper mixture for burning. This mixture of air and illuminating gas is evenly distributed throughout the cavity 50 adjacent to the perforated ceramic plate 46. The mixture of illuminating gas and air seeps through the perforations of the plate 46 and is ignited to burn on the exterior surface of the plate, designated 62. Because of the relatively low temperature, approximately 1600° Fahrenheit, a relatively large percentage of the converted energy is in the form of infra-red radiation. Also, the interior surface surface of the perforated plate 46, designated 64 is maintained at a temperature of approximately 400° Fahrenheit, below the ignition temperature of the gas and air mixture. The relatively low temperature of the interior surface of the plate 46 is achieved through the combination of high thermal conductivity for the housing 42 and low thermal conductivity for the ceramic plate 46. As a result, approximately 60 percent of the energy produced by the generator is in the infra-red range, particularly in the range of 1.5 to 6.0 microns, and only approximately 40 percent of the generated energy is in the form of heat.

FIGURE 1 diagrammatically illustrates a source of illuminating gas 66, and the illuminating gas may be either manufactured gas, or natural gas in the form of propane, butane, or other gases which may be utilized in the manner of liquid petroleum gas. As illustrated in FIGURE 1, the gas source 66 is connected to the radiant heater 18 and 20 through a valve 68 which is electrically actuated and a manual valve 70. The valve 68 is connected to the orifice plug 52 of each of the infra-red generator 24, 26, 28, and 30 of both of the radiant heaters 18 and 20. The valve 70 is connected to the pilot burners 72 of each of the radiant heater 18 and 20, and the pilot burners 72 are adjusted to maintain a continuous flame so that the generators 24, 26, 28, and 30 of both radiant heaters 18 and 20 will immediately ignite upon passage of illuminating gas from the source 66 through the valve 68. The valve 68 is an electrically actuated valve, and it is connected through a thermostat 74 to a source of electrical power 76. The electrical power source may be a 110 volt alternating current line power source as is conventionally available, or a separate direct current source. The thermostat is mounted on one of the walls 14 of the building 10 near the floor of the building to sense the temperature of the space at that location in the building. When the temperature falls below a desired value, the thermostat connected the power source 76 in series with the electrical control means of the valve 68 to open the valve to the passage of illuminating gas from the source 66 and actuate the radiant heaters 18 and 20.

Immediately above the radiant heater 18 is a gas to gas heat exchanger 78, and immediately above the radiant heater 20 is a second gas to gas heat exchanger 80. The heat exchanger 78 is illustrated mounted on the straps 22 in common with the radiant heater 18, but it may equally well be mounted on separate straps and independently of the radiant heater 18. In like manner, the heat exchanger 80 is mounted on the same straps 22 as the radiant heater 20, but it likewise may equally well be mounted independently on the ceiling or other portions of the building from the radiant heater 20.

Each of the heat exchangers 78 and 80 is in the form of an elongated rectangular sheet metal box, designated 82. Within the box 82 are three parallel deflectors 84, 86, and 88 which extend vertically, the deflectors 84 and 88 from the top wall of the box 82, and the deflector 86 mid-way between the deflectors 84 and 88 from the bottom wall of the box 82. The box 82 has openings 90 and 92 at its opposite ends, and the openings 90 and 92 are utilized to connect the heat exchangers 78 and 80 in a circulation circuit. The opening 90 of the heat exchanger 80 connects to a depending tube 94 which has an opening 96 disposed below the level of the radiant heaters 18 and 20. The opening 96 is for the purpose of introducing air from the confined space 12 into the circulating system. The opening 92 of the heat exchanger 80 is interconnected with the opening 90 of the heat exchanger 78 by a tube 98, and the opening 92 of the heat exchanger 78 is connected to a fan assembly 100 by means of a tube 102. The fan assembly 100 is connected to a heat outlet register 104 through a tube 106. The fan assembly 100 has a cylindrical housing 108 which contains a squirrel cage fan 110 with a shaft 112 connected to an electric motor 114. The cylindrical housing 108 of the fan assembly has a partition 116 with a central aperture 118, and a portion of the housing 108 on the side of the partition 116 opposite the squirrel cage 110 is in communication with the tube 102. The portion of the housing on the side of the partition 116 of the squirrel cage 110 is in communication with the tube 106 and the register 104.

The electric motor 114 is connected to a second source of electrical power 120, although it is to be understood that the first source 76 could also be employed for this purpose. A thermostat 122 is mounted on the box 82 of the heat exchanger 78, and is electrically connected in series electrically with the motor 114 and the power source 120. The thermostat closes and completes this electrical circuit when it is subjected to a temperature above a threshold value, for example 100° Fahrenheit, thereby actuating the motor 114 and the fan assembly 100 to cause air to circulate from the opening 96 to the register 104 of the circulating system.

The combination space and radiant heating system illustrated in FIGURES 1 through 3 operates in the following manner. If it is assumed that the temperature of the confined space 12 is above the actuation temperature of the thermostat 74, the system remains dormant, except for the pilot 72 of the radiant heater 18 and radiant heater 20. When the temperature of the confined space 12 falls below the actuation temperature of the thermostat 74, the valve 68 is actuated to open position to pass gas from the source 66 to the infra-red generators 24, 26, 28, and 30 of the radiant heaters 18 and 20. The continually burning pilot 72 ignites gas passing through the perforated plates 46 to create burning on the exterior surface 62 of the perforated plates 46 of the infra-red generators, thereby producing both radiant energy and thermal energy. The radiant energy immediately traverses the air between the radiant heaters 18 and 20 to become absorbed in a confronting body and thereby liberating heat. The thermal energy generated by ignition of the gases at the exterior surface 62 of the plates 46 flows with the exhaust gases and vapors through the orifices 38 of the covers 34 which are mounted on the frame 32 of the radiant heaters 18 annd 20 to rise upwardly toward the roof 16 of the building structure 10. As the gases rise, they contact the exterior surface of the box 82 and heat this surface. The box 82 is constructed of sheet metal, or other material of high thermal conductivity, thereby heating the volume of air disposed within the box 82. The gases and vapors of combustion continue to rise above the heat exchangers 78 and 80 and pass through a vent or port 124 in the roof 16 of the building structure 10 to the exterior.

As the temperature of the air within the boxes 82 of the heat exchangers 78 and 80 rises, this temperature exceeds the threshold value of the thermostat 122 actuating the thermostat. Actuation of the thermostat 122 closes the electrical circuit of the motor 114 and power source 120 to actuate the fan assembly 100. As a result, the fan assembly forces air out through the register 104 and creates a circulation of air through the heat exchangers 78 and 80 to produce space heating from the register 104. The register 104 is preferably disposed adjacent to the floor of the building structure 10, since warm air will rise therefrom.

It is to be understood that more than two heat exchangers may be utilized in practicing the present invention, and other types of gas to gas heat exchangers may also be utilized. Further, a single heat exchanger may also be utilized with a single radiant heater in order to utilize the thermal energy liberated in the process of producing radiant infra-red energy.

It is important that the opening 96 in the tube 94 be located below the level of the radiant heaters 18 and 20, since the exhaust gases and vapors from the combustion at the exterior surface of the perforated plates 46 of the infra-red generators would be circulated into the confined space 12 if the opening 96 were disposed above the level of the radiant heaters 18 and 20. It is to be noted that the embodiment of FIGURE 1 of the present invention minimizes the piping necessary for installing the combination space and radiant heater, since no piping is provided for venting the gases and vapors of combustion. As a result, the vapors of combustion may condense on the roof 16 of the building and cause dripping into the confined space unless adequate insulation is provided on the roof of the building to avoid condensation.

FIGURES 4, 5 and 6 illustrate a heat exchanger 80D which may be directly substituted for the heat exchanger 80 illustrated in FIGURE 1. The heat exchanger 80D has a rectangular box 160 of material having a high coefficient of thermal conductivity, and the box 160 is mounted in the same position illustrated for the box 82 of FIGURE 1. The box 160 has a flat horizontal upper wall 162, a lower wall parallel to the upper wall designated 164, and end walls 166 and 168. In addition, the box has side walls 170 and 172.

The box 160 has an opening 174 in one end wall 166 adjacent to the top wall 162, and the box also has a second opening or outlet 176 disposed in a similar location in the other end wall 168. The baffles 178 extend downwardly into the box 160 from the top wall 162, the baffles 178 being equally spaced. Also, two baffles 180 extend upwardly from the bottom wall 164 and are disposed midway between baffles 178. In this manner, a serpentine passage for air is provided through the box 160. An inlet pipe 182 is open at one end 184 and has its opposite end sealed within the opening 174. The pipe 182 corresponds to the pipe 94 of the embodiment of FIGURE 1. In like manner, an outlet pipe 186 has one end sealed within the opening 176, and the pipe 186 corresponds to the pipe 98 of the embodiment of FIGURE 1.

A radiant heater 188 is mounted on the lower wall 164 of the box 160, and the radiant heater 188 is identical in construction to the radiant heaters illustrated in FIGURES 1 through 3. Two pairs of end brackets 190 and 192 located at opposite ends of the radiant heater 188 extend between the radiant heater 188 and the lower wall 164 of the box 160. Also, the radiant heater 188 has a hood 194 depending therefrom.

The hood 194 is illustrated as having four flat walls 196, 198, 200, and 202, and the walls terminate at their edges opposite the box 160 in a flat horizontal plane. As illustrated, the walls are flat, but it is to be understood that the walls may be parabolic, or the like. The walls of the hood 194 function to direct the radiant energy from the radiant heater 188 and also to prevent combustion gases from escaping from the downward side of the perforated porous plate 46 illustrated in FIGURES 2 and 3. The combustion gases tend to rise, and pass through the openings 38, illustrated in FIGURES 2 and 4, to enter the region disposed between the radiant heater 188 and the lower wall 164 of the heat exchanger or box 160.

A second hood 204 extends about the entire box 160. The hood 204 has a flat top 206 with a rectangular cross section and dimensions approximating or slightly larger than the upper wall 162 of the box 160. Four flat plates 208, 210, 212, and 214 extend downwardly from the flat wall 206 of the second hood 204, and one edge of the plates 208, 210, 212, and 214 is sealed against the passage of gases to an edge of the top plate 206. Also, the plates 208, 210, 212, and 214 are sealed to each other to form an air tight enclosure open only at the bottom which extends completely around the heat exchanger box 160 and flares outwardly from the upper wall 206 thereof. Further, the edges of the plates 208, 210, 212, and 214 remote from the upper wall 206 terminate on a common horizontal plane which is located above the plane of the porous plates of the infra-red generators, designated 46 in FIGURES 2 and 4.

The end 184 of the pipe 182 is open, and this end is disposed below the plane of the porous plates of the infra-red generators utilized in the radiant heater 188. Relatively fresh air, that is, air which is not contaminated with combustion gases, enters the end 184 of the plate 182 and flows into the heat exchanger 80A. Within the heat exchanger, air removed from the surroundings is heated by the gases of combustion from the radiant heater 188, in the manner previously described. However, the gases of combustion are collected within the second hood 204 and are confined against and in thermal contact with the exterior surface of the box 160, thereby substantially increasing the temperature of this exterior surface. As the combustion gases, which are warmer than the surrounding atmosphere cool, these gases will fall along the interior surface of the second hood to the lower edge thereof and escape around this edge. It is to be noted that the lower edge of the second hood 204 must be located above the plane of the porous plates of the infra-red generators in order to prevent the gases of combustion from extinguishing the infra-red generators.

As illustrated in FIGURES 4 through 6, the pipe 182 penetrates an aperture 216 in the plate 214, and the pipe 186 penetrates an aperture 218 in the plate 210. It is to be understood that these apertures are sealed to the pipes 182 and 186. Further, the apertures may be located in the upper wall 206 of the second hood 204 rather than in the plates 214 and 210.

It is further to be understood that one or more radiant heating units 188 may be employed in accordance with the present invention, and a plurality of heat exchangers 80A may be connected in series, in the manner illustrated in FIGURE 1. However, the use of the second hood 204 is primarily of advantage in a radiant heating system such as set forth in FIGURE 1 in which exhaust gases from the radiant heaters are permitted to rise through the ambient atmosphere to an opening in the ceiling of the room, and the exhaust gases are not confined to an exhaust chimney or outlet system.

Those skilled in the art will readily devise many applications for the present invention beyond that herein illustrated. Also, those skilled in the art will develop modifications of the structure here set forth within the intended scope of the present invention. It is therefore intended that the scope of this invention be not limited by the foregoing disclosure, but rather only by the appended claims.

The invention claimed is:

1. A combination radiant and space heater comprising an infra-red generator having a housing provided with a cavity therein and an opening communicating with the cavity, a porous plate mounted on the housing and sealed about the opening, valve means for introducing illuminating gas into the cavity and maintaining the cavity at a gas pressure sufficient to force gas through the plate to permit the gas to burn on the opposite side of the porous plate at a relatively low temperature to produce substantial infra-red radiation, a closed air circulating system disposed adjacent to the infra-red generator, said circulating system having an inlet at one end adapted to be disposed below the level of the porous plate and an outlet at the other end, said circulating system including a gas to gas heat exchanger disposed on the opposite side of the housing from the porous plate, said heat exchanger having a box of material having a high coefficient of heat conductivity and being in thermal communication with the exhaust gases and vapors generated at the side of the porous plate opposite the cavity, said heat exchanger having an air tight passage disposed in the circulation system and said heat exchanger having an air impermeable hood positioned adjacent to the box of the heat exchanger in a region thereof remote from the porous plate, said hood extending outwardly from the box toward the porous plate to deflect hot combustion vapors rising from the opposite side of the porous plate into thermal contact with the box, whereby an object may be placed below the infra-red generator and in the radiation field of the infra-red generator and the outlet of the circulation system directed toward the space surrounding the object to heat the object by infra-red radiation and the surrounding space by a flow of heated air.

2. A combination radiant and space heater comprising the combination of claim 1 wherein the housing is provided with a frame and a plurality of infra-red generators are mounted on the frame with the porous plates thereof in a common plane, each generator having a housing constructed of non-flammable material and having a high thermal conductivity, said housing having a cavity therein and a porous plate of material of low thermal conductivity disposed on one side of the cavity, the porous plates of the generators being disposed in a common plane, said frame carrying a gas impermeable second hood extending from the side of the plane of the porous plates opposite the housings of the generators, said second hood extending below the first hood and said frame having an opening therein for combustion gases and vapors to pass through from the side of the plane of the porous plates opposite the housings of the infra-red generators.

3. A combination radiant and space heater comprising the elements of claim 2 wherein the gas to gas heat exchanger comprises an elongated box of thermal conducting material, the exterior surfaces of the box being in the path of the gases and vapors of combustion, said box having openings at opposite ends communicating with the circulating system, and a plurality of baffles therein, and the first hood completely encompassing the box and forming a gas impermeable barrier about said box open at the bottom.

4. A heating system for a building having walls enclosing the space to be heated and an opening near the highest portion of the building communicating with the ambient atmosphere comprising the combination of claim 1 disposed within the building and mounted above the floor thereof with the porous plate confronting the floor, the closed air circulating system thereof having the inlet at one end disposed below the level of the second hood and an outlet at the other end disposed adjacent to the floor.

5. A heating system for a building having walls enclosing the space to be heated and a port near the highest portion of the building communicating with the ambient atmosphere comprising, an infra-red generator having a housing and a porous plate mounted and sealed on the housing, said housing having a cavity on one side of the plate, means for mounting the infra-red generator within the building above the surface of the floor of the building with the porous plate generally horizontal and below the housing, valve means for introducing illuminating gas into the cavity of the infra-red generator and maintaining the cavity at a gas pressure sufficient to force gas through the plate to permit the gas to burn on the lower side of the porous plate at a relatively low temperature to produce substantial infra-red radiation, and an air impermeable circulating system having an inlet at one end disposed below the level of the porous plate and an outlet at the other end adjacent to the floor, said circulating system including a gas to gas heat exchanger having a heat conducting box mounted directly above the infra-red generator and in thermal communication with the exhaust gases and vapors generated at the lower side of the porous plate, said heat exchanger including a hood disposed about the thermally conducting box and extending outwardly and downwardly from the box, said hood terminating on a level above the porous plate, said heat exchanger having an air tight passage disposed in the circulation system, whereby the floor of the building and the objects on the floor of the building will be heated by infra-red energy and the space within the building will be heated by the warm air coming from the outlet end of the circulating system adjacent to the floor, and the vapors and gases of combustion will exit to the ambient atmosphere through the port.

6. A heating system for a building comprising the combination of claim 5 wherein the hood has an upper wall disposed above the box and an outwardly flaring portion extending from the upper wall and sealed thereto extending downwardly from the upper wall, said outwardly flaring portion surrounding the entire box and being spaced therefrom to trap rising combustion gases from the generator between the outwardly flaring portion and the box, said outwardly flaring portion terminating above the level of the porous plate to permit the ambient atmosphere unimpeded access to the porous plate.

7. A heating system for a building comprising the combination of claim 6 in combination with a second hood extending about the infra-red generator and extending outwardly and downwardly therefrom, said second hood terminating on a level between the inlet of the circulating system and the termination level of the first hood, said second hood having a passage above the lower surface of the porous plate for the flow of combustion gases upwardly from the porous plate.

References Cited by the Examiner
UNITED STATES PATENTS

| | | |
|---|---|---|
| 1,639,114 | 8/1927 | Smith. |
| 1,945,379 | 1/1934 | Roesch. |
| 3,190,556 | 6/1965 | Marland _____ 237—50 |

FOREIGN PATENTS 763,402  12/1956  Great Britain.

EDWARD J. MICHAEL, Primary Examiner.